Figures 1, 2:
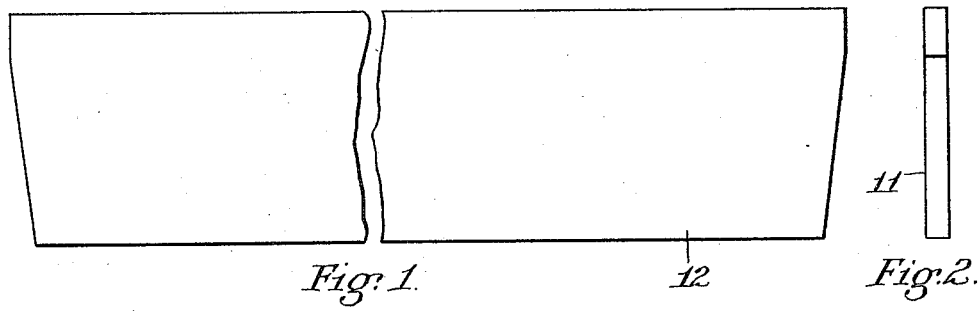

D. L. CHANDLER.
METHOD OF MANUFACTURING COMBS.
APPLICATION FILED DEC. 3, 1910.

998,675.

Patented July 25, 1911.

Witnesses:
Leonard A. Powell
Sydney E. Taft

Inventor:
Daniel L. Chandler,
by his attorney,
Charles N. Gooding.

UNITED STATES PATENT OFFICE.

DANIEL L. CHANDLER, OF AYER, MASSACHUSETTS.

METHOD OF MANUFACTURING COMBS.

998,675.

Specification of Letters Patent. Patented July 25, 1911.

Application filed December 3, 1910. Serial No. 595,420.

*To all whom it may concern:*

Be it known that I, DANIEL L. CHANDLER, a citizen of the United States, residing at Ayer, in the county of Middlesex and State of Massachusetts, have invented new and useful Improvements in Methods of Manufacturing Combs, of which the following is a specification.

This invention relates to an improved method of manufacturing combs.

Combs at present are manufactured in a variety of ways. One way is to punch out the material between the teeth of the comb; another way is to cut out the material with a gang of circular saws which pass through from one side to the other and the comb is fed toward the center of the saws; and still another way is to cut the teeth one at a time by feeding the blank radially onto a single rotary cutter. The blank having the teeth cut in this manner is left with the teeth of the full width of the thickness of the comb and has to be subsequently passed through a number of operations, one of which shapes the blank upon opposites sides to point the teeth and to bevel off the blank from the front edge toward the back edge. After this is done, the teeth are "grailed," so-called—that is, the edges of each of the teeth are rounded by holding the edges of the teeth, a few at a time, against a rotary wheel with grooves corresponding to the teeth. All of these different processes are very slow and necessarily expensive, as they are performed by hand with the aid of crude machinery such as indicated above. Moreover, where several teeth are cut in a blank at once by a gang of circular saws which cut crosswise or entirely through the blank simultaneously, great heat is produced and combs made of celluloid cannot be manufactured in this way, as they are inflammable and the heat is sufficient to cause combustion. Moreover, where a gang of saws is employed to simultaneously saw out the material between the teeth, the teeth become warped by the heat, and when the cutters are removed they spring laterally toward or away from each other, making a very unsatisfactory comb both as to looks and for use.

My improved method of manufacturing combs consists in cutting a plurality of grooves, preferably all at one time, in one face of the blank, these grooves corresponding to the spaces which eventually appear between the teeth of the comb. Said grooves extend in the first part of the operation part way through the blank and at the same time the "grailing" operation— that is, the rounding of the edges of the toothed portion which is left on one face of the blank, is performed. Likewise the shaping of the comb to cause the opposite edges of the teeth to approach each other in the form of a wedge, or, in other words the sharpening of the teeth and the beveling of the two end portions or teeth of the comb is simultaneously performed. After one side has thus been operated upon, the blank is preferably inverted and the same operation performed upon the opposite side of the blank from the opposite face thereof, the grooves in the opposite faces being made in alinement with each other and the second set of grooves extending in from the second face operated upon intersect with the first set of grooves so as to form spaces between the teeth. Finally, if desired, a gang of cutters may be run in between the teeth to remove any sharp edges that may be left at the point where the two sets of grooves from opposite faces of the comb intersect each other.

In carrying my improved method into practical operation, I prefer to utilize a machine in which a rotary cutter or cutters are employed and in which the blank is clamped to a suitable support or carrier which is automatically fed forward and given a motion compounded of a forward movement and an up and down movement, thus imparting to the comb blank a path in a predetermined curve and simultaneously the teeth are thus cut part way through the blank, "grailed" and the blank and teeth beveled or pointed. The blank is then inverted and the operation repeated upon the opposite face of the same as hereinbefore described.

Figures 3, 4, 5:
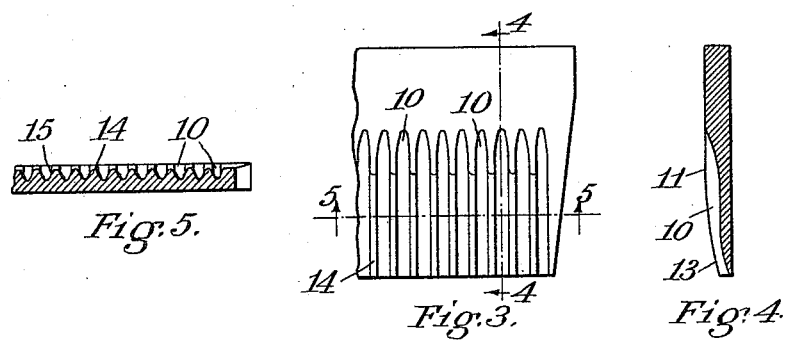
Figures 6, 7, 8:
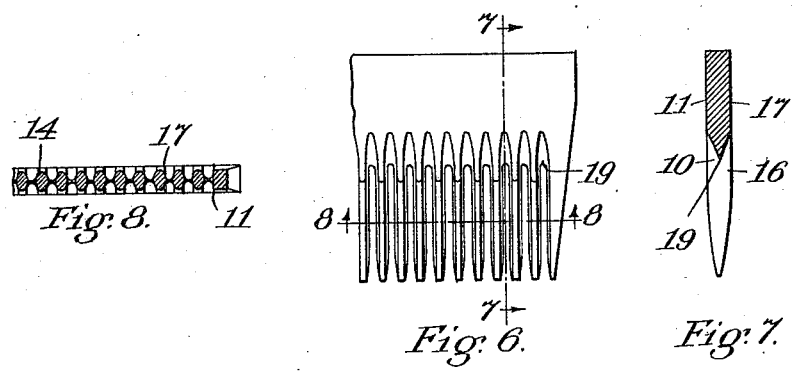
Figure 9:
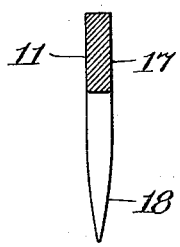

In the drawings representing my improved method, Figure 1 is a front view of a blank of sheet material from which the comb is to be manufactured. Fig. 2 is an end view of the same. Fig. 3 is a front view similar to Fig. 1 showing the grooves cut into the blank in one face thereof and broken away. Fig. 4 is a detail section taken on line 4—4 of Fig. 3. Fig. 5 is a detail section taken on line 5—5 of Fig. 3. Fig. 6 is a front elevation of the comb as it appears after having been inverted and the second set of grooves cut into the same and beveled and "grailed," and broken away. Fig. 7 is a detail section taken on line 7—7 of Fig. 6. Fig. 8 is a detail section taken on line 8—8 of Fig. 6. Fig. 9 is a transverse section between the teeth of a completed comb.

Like numerals refer to like parts throughout the several views of the drawings.

In the drawings, 10, 10 are grooves cut into one face 11 of the blank 12. It will be noted that these grooves extend part way through said blank and also that the blank is beveled off on the line 13, Fig. 4, and that the edges of the teeth 14, 14 are rounded off or "grailed" as seen in Fig. 5, and that the sides 15, 15 of the grooves 10, 10 are inclined to each other, the purpose of this being so that when the groove is cut in from the other side there will be no chance of a shoulder being formed by the intersection of the grooves from opposite sides, as said sides 15, 15 diverging from each other meet the diverging sides from the opposite side of the comb at a slight angle and thus intersect the same and remove all surplus material or fins which might otherwise occur.

In Figs. 6 and 7 the grooves 16, 16 have been formed intersecting with grooves 10, 10, as clearly seen in Fig. 7, and simultaneously with the forming of these grooves 16, 16 the side 17 of the comb has been beveled toward the points 18 of the teeth and the "grailing" of the edges of the teeth on the side 17 of the blank has also been accomplished, as will be seen by reference to Fig. 8. Finally, after the comb has been brought to the condition illustrated in Figs. 7 and 8, the fin 19 which appears at the intersection of the grooves 10 and 16 is removed, as hereinbefore set forth, by running a gang of cutters in between the finished teeth 18 and thus cutting off the sharp corner 19 as illustrated in Fig. 9.

Having thus described my invention, what I claim and desire by Letters Patent to secure is:

1. The herein described method of manufacturing combs which consists of making a plurality of grooves in one face of a blank of sheet material and extending part way through said blank and subsequently making a plurality of grooves in the opposite face of said blank in alinement with the first-named grooves and extending part way through said blank, whereby a plurality of teeth with spaces therebetween are formed upon said blank.

2. The herein described method of manufacturing combs which consists of making a plurality of grooves in one face of a blank of sheet material and extending part way through said blank, then inverting said blank and subsequently making a plurality of grooves in the opposite face of said blank in alinement with the first-named grooves and extending part way through said blank, whereby a plurality of teeth with spaces therebetween are formed upon said blank.

3. The herein described method of manufacturing combs which consists of making a plurality of grooves in one face of a blank of sheet material and extending part way through said blank and at the same time beveling a portion of said blank on one face adjacent one edge of said blank and rounding off the edges of the pieces of material left between said grooves, and subsequently making a plurality of grooves in the opposite face of said blank in alinement with the first-named grooves and extending part way through said blank and simultaneously with the last-named step beveling a portion of said blank on said opposite face adjacent said edge of said blank and rounding off the edges of the pieces of material left between said last-named grooves in said opposite face, whereby a plurality of pointed teeth with spaces therebetween and having rounded edges are formed upon said blank.

In testimony whereof I have hereunto set my hand in presence of two subscribing witnesses.

DANIEL L. CHANDLER.

Witnesses:
CHARLES S. GOODING,
LOUIS A. JONES.

Copies of this patent may be obtained for five cents each, by addressing the "Commissioner of Patents, Washington, D. C."